(12) United States Patent
Luipold

(10) Patent No.: US 9,022,196 B2
(45) Date of Patent: May 5, 2015

(54) CLUTCH ASSEMBLY WITH A TAB RIVET CONNECTION AND METHOD THEREOF

(71) Applicant: Schaeffler Technologies AG & Co. KG, Herzogenaurach (DE)

(72) Inventor: Chris Luipold, Wadsworth, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 151 days.

(21) Appl. No.: 13/849,030

(22) Filed: Mar. 22, 2013

(65) Prior Publication Data

US 2013/0256080 A1 Oct. 3, 2013

Related U.S. Application Data

(60) Provisional application No. 61/616,137, filed on Mar. 27, 2012.

(51) Int. Cl.
| | |
|---|---|
| *F16D 1/072* | (2006.01) |
| *F16D 11/14* | (2006.01) |
| *F16D 13/68* | (2006.01) |

(52) U.S. Cl.
CPC ........... *F16D 11/14* (2013.01); *F16D 1/072* (2013.01); *F16D 13/683* (2013.01); *F16D 2250/0061* (2013.01)

(58) Field of Classification Search
USPC .............. 192/70.16, 112, 115; 74/446, 451
See application file for complete search history.

(56) References Cited

U.S. PATENT DOCUMENTS

| | | | |
|---|---|---|---|
| 3,887,984 A | 6/1975 | Erlichman | |
| 4,043,021 A * | 8/1977 | Mosbacher et al. | 29/437 |
| 4,537,295 A | 8/1985 | Fadler et al. | |
| 5,026,337 A | 6/1991 | Miura et al. | |
| 5,658,215 A * | 8/1997 | Premiski et al. | 475/331 |
| 5,792,020 A | 8/1998 | Kikuchi et al. | |
| 5,916,056 A | 6/1999 | Okada | |
| 7,975,820 B2 | 7/2011 | Uhler | |
| 8,523,731 B2 * | 9/2013 | Nonnweiler et al. | 475/331 |
| 2011/0203897 A1* | 8/2011 | Keating | 192/112 |
| 2012/0006642 A1 | 1/2012 | Greathouse et al. | |

FOREIGN PATENT DOCUMENTS

| | | |
|---|---|---|
| KR | 1020040033876 A | 4/2004 |
| WO | WO 2010/149472 A1 * | 12/2010 |

OTHER PUBLICATIONS

International Search Report for PCT/US2013/032776, mailed Aug. 22, 2013 by the Korean Intellectual Property Office.

* cited by examiner

*Primary Examiner* — Rodney H Bonck
(74) *Attorney, Agent, or Firm* — Simpson & Simpson, PLLC

(57) ABSTRACT

A clutch assembly, including: a hub including a first radially disposed portion with a plurality of circumferentially aligned slots passing though the first radially disposed portion; and a ring gear carrier including a plurality of protrusions disposed in the plurality of circumferentially aligned slots and in compressive engagement with the hub to fixedly connect the hub to the carrier. Each slot in the plurality of circumferentially aligned slots extends further in a circumferential direction than in a radial direction. Each protrusion in the plurality of protrusions extends further in the circumferential direction than in the radial direction.

17 Claims, 10 Drawing Sheets

CLUTCH ASSEMBLY WITH A TAB RIVET CONNECTION AND METHOD THEREOF

CROSS-REFERENCE TO RELATED APPLICATIONS

This application claims the benefit under 35 U.S.C. §119 (e) of U.S. Provisional Patent Application No. 61/616,137, filed Mar. 27, 2012, which application is incorporated herein by reference.

TECHNICAL FIELD

The present disclosure relates a clutch assembly with a ring gear carrier and a hub joined by protrusions from the carrier disposed in slots in the hub, in particular, protrusions formed by bending portions of a circumference for the carrier.

BACKGROUND

It is known to join a carrier and a hub for a transmission clutch assembly using welding, for example as taught by U.S. Pat. No. 5,916,056. However, welding is costly and can result in heat distortion of parts and contamination from splatter. It is also known to join a carrier and a hub for a transmission clutch using a spline and snap ring arrangement, for example as taught by U.S. Pat. No. 5,026,337. However, this arrangement increases the complexity of the assembly and requires an undesirable increase in the axial extent of the assembly.

SUMMARY

According to aspects illustrated herein, there is provided a clutch assembly, including: a hub including a first radially disposed portion with a plurality of circumferentially aligned slots passing though the first radially disposed portion; and a ring gear carrier including a plurality of protrusions disposed in the plurality of circumferentially aligned slots and in compressive engagement with the hub to fixedly connect the hub to the carrier. Each slot in the plurality of circumferentially aligned slots extends further in a circumferential direction than in a radial direction. Each protrusion in the plurality of protrusions extends further in the circumferential direction than in the radial direction.

According to aspects illustrated herein, there is provided a method of fabricating a clutch assembly, including: forming a plurality of circumferentially aligned slots in a first radially disposed portion of a hub, such that each slot in the plurality of circumferentially aligned slots extends further in a circumferential direction than in a radial direction; forming a plurality of protrusions extending from a second radially disposed portion of a ring gear carrier such that each protrusion in the plurality of protrusions extends further in the circumferential direction than in the radial direction; inserting the plurality of protrusions in the plurality of circumferentially aligned slots such that respective segments of the plurality of protrusions extend beyond the first radially disposed portion; and exerting force on the plurality of protrusions such that the plurality of protrusions compressively engage the first radially disposed portion to fixedly connect the hub to the ring gear carrier.

According to aspects illustrated herein, there is provided a clutch assembly, including a hub with a first radially disposed portion and a plurality of circumferentially aligned slots in the first radially disposed portion. The assembly includes a ring gear carrier with a second radially disposed portion forming a radially innermost circumference for the ring gear carrier and a plurality of protrusions extending in an axial direction from the second radially disposed portion, disposed in the plurality of circumferentially aligned slots, and in compressive engagement with the first radially disposed portion to fixedly connect the hub to the carrier. Respective openings formed by the plurality of circumferentially aligned slots are wholly surrounded by the first radially disposed portion. Each slot in the plurality of circumferentially aligned slots extends further in a circumferential direction than in a radial direction. Each protrusion in the plurality of protrusions extends further in the circumferential direction than in the radial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
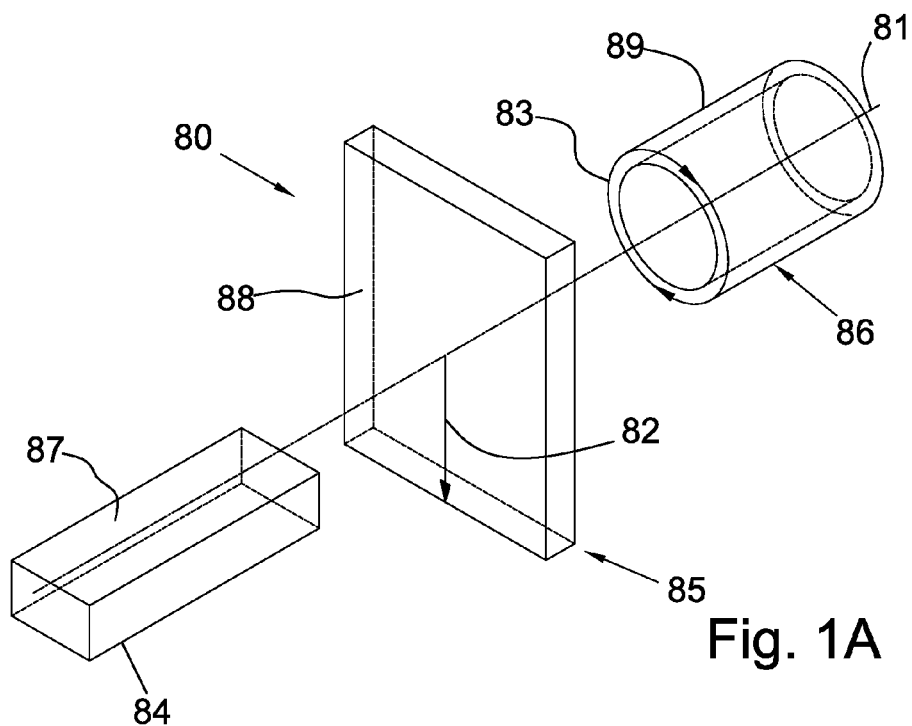
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
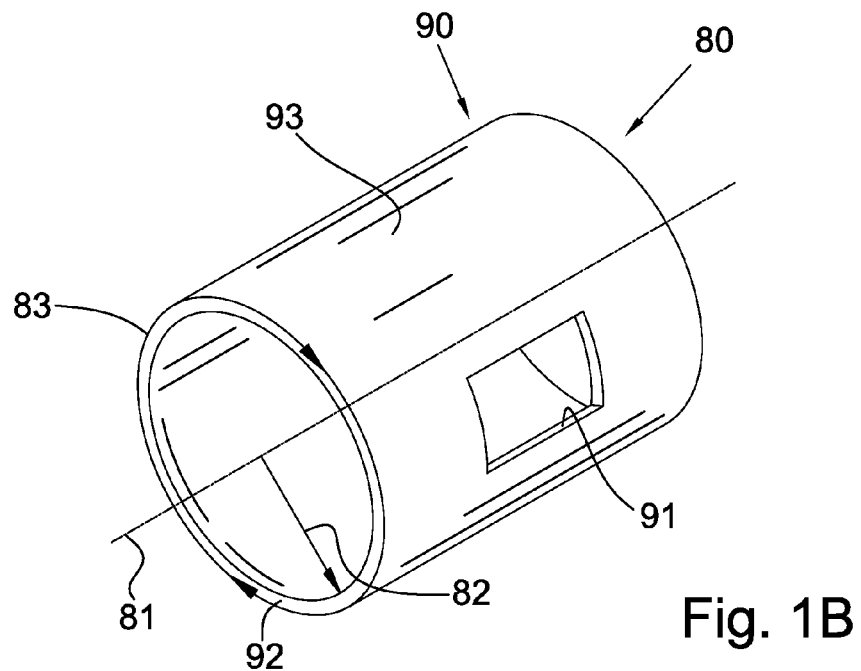
FIG. 1B is a perspective view of an object in the cylindrical coordinate system of FIG. 1A demonstrating spatial terminology used in the present application; and, FIG. 2 is a partial cross-sectional view of clutch assembly with a tab rivet connection.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
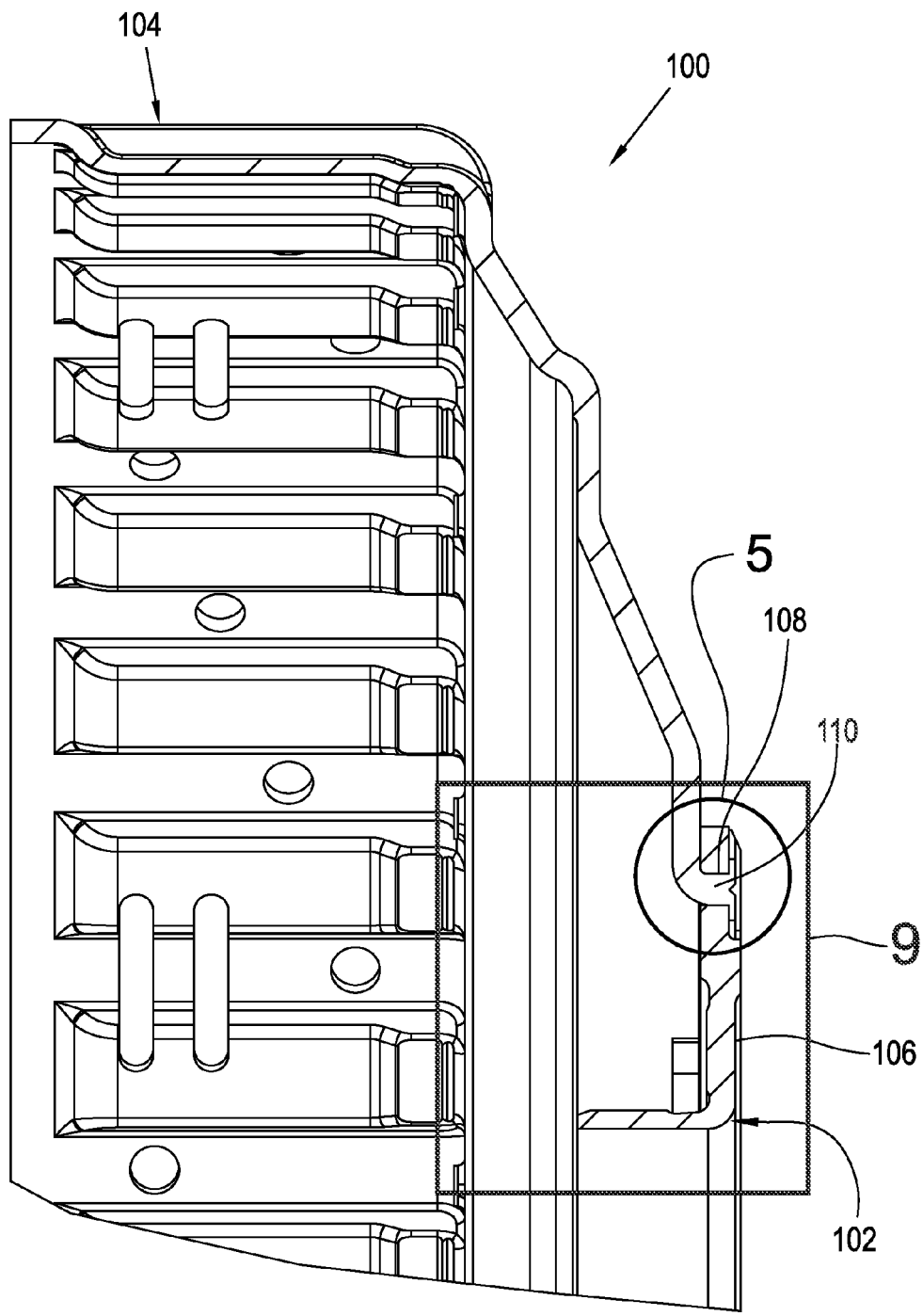

FIG. 2 is a partial cross-sectional view of clutch assembly 100 with a tab rivet connection.

Figure 3:
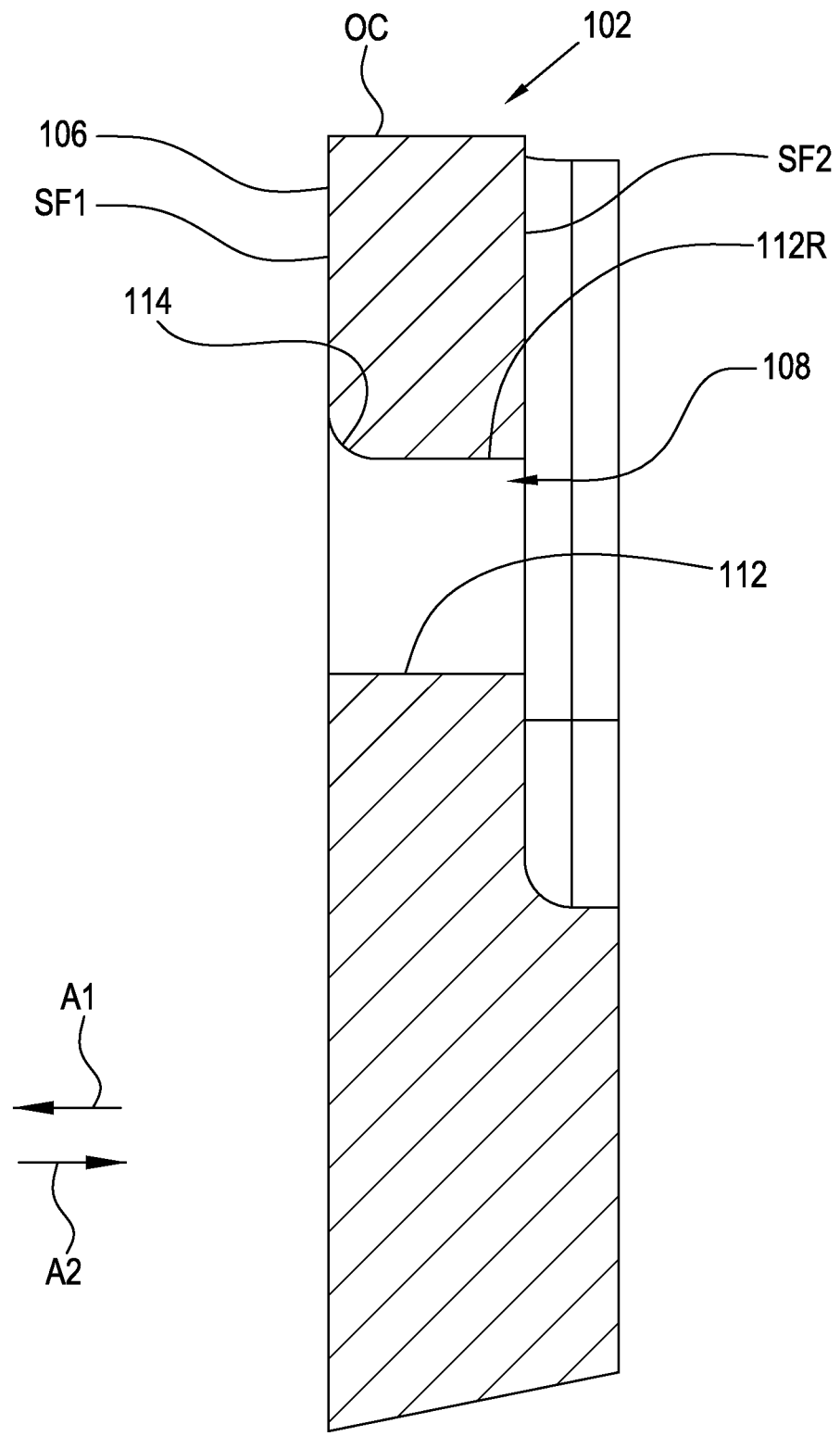
FIG. 3 is a detail of the hub shown in FIG. 2.

FIG. 3 is a detail of the hub shown in FIG. 2.

Figure 4:
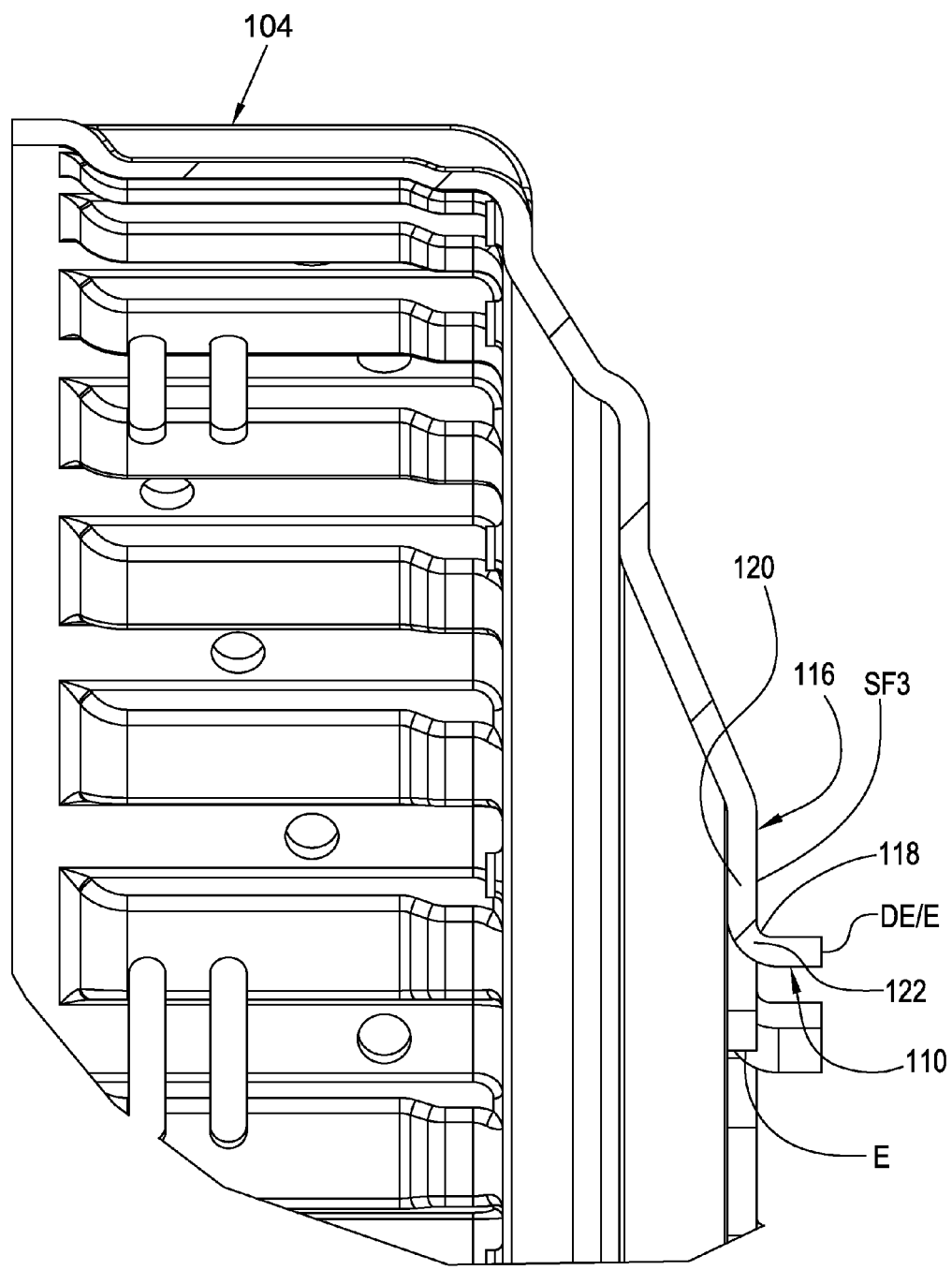
FIG. 4 is a cross-sectional view of the ring gear carrier shown in FIG. 2.

FIG. 4 is a cross-sectional view of the ring gear carrier shown in FIG. 2.

Figure 5:
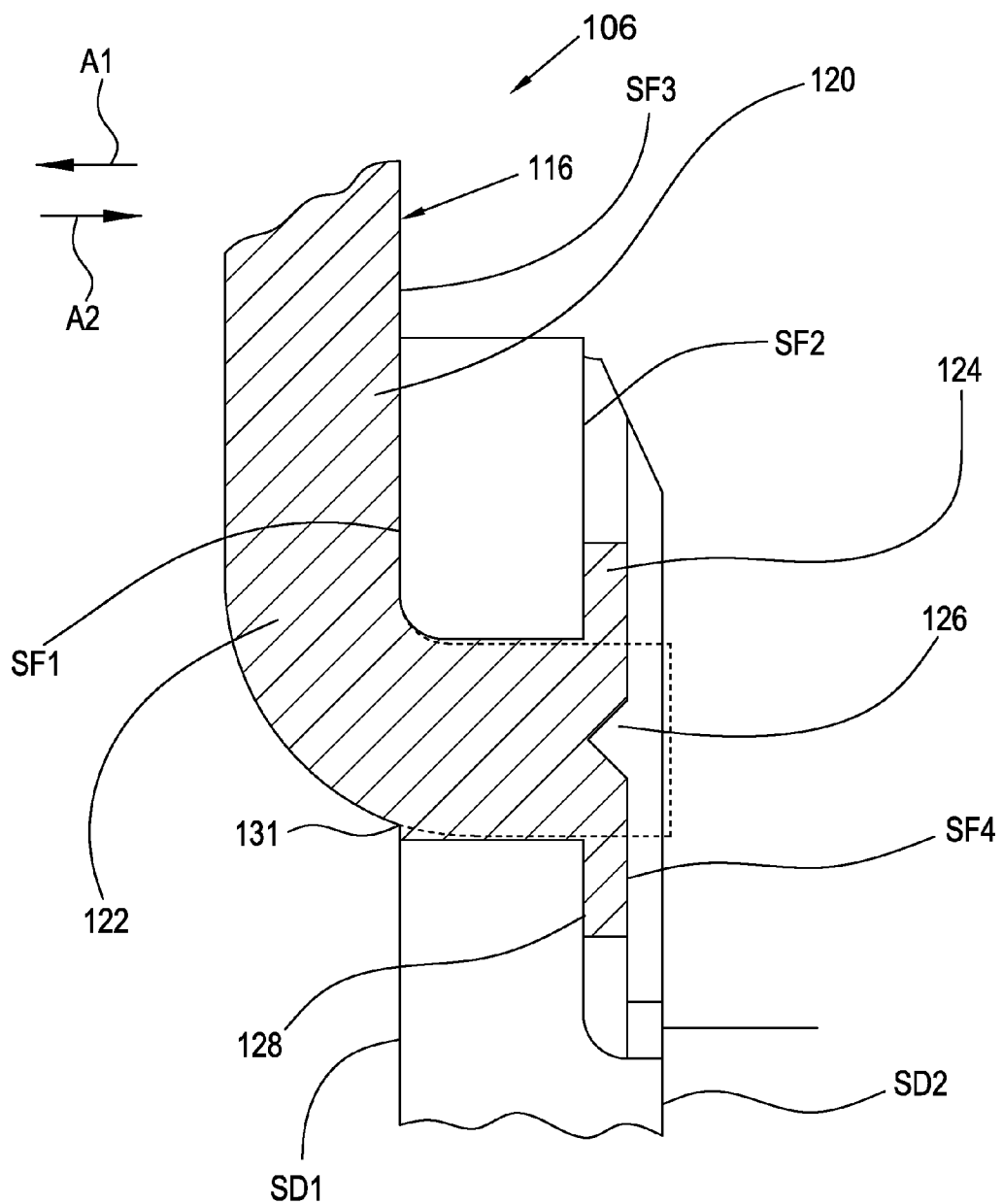
FIG. 5 is a detail of area 5 in FIG. 2.

FIG. 5 is a detail of area 5 in FIG. 2. The following should be viewed in light of FIGS. 2 through 5. Clutch assembly 100 includes hub 102 and ring gear carrier 104. The hub includes radially disposed portion 106 with circumferentially aligned slots 108 passing though portion 106. The ring gear carrier includes protrusions, or tab rivets, 110 disposed in slots 108 and in compressive engagement with the hub, in particular, edges 112 of the slots, to fixedly connect the hub to the carrier.

Figure 6:
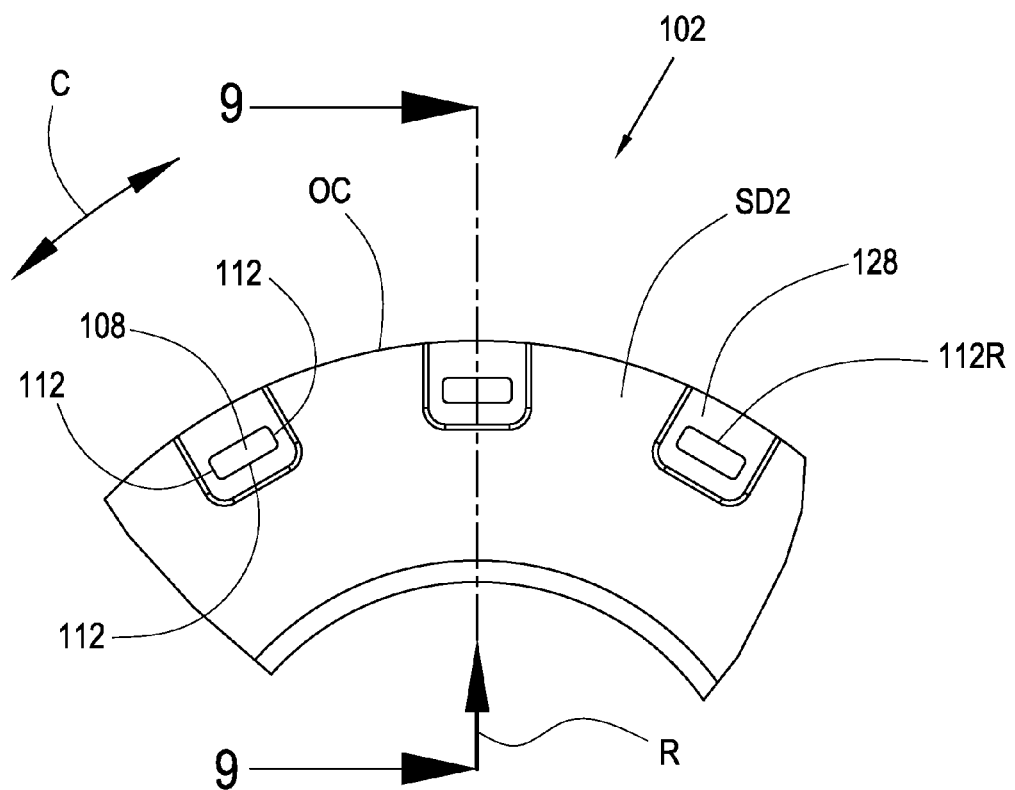
FIG. 6 is a back view of the hub shown in FIG. 2.

FIG. 6 is a back view of hub 102 shown in FIG. 2.

Figure 7:
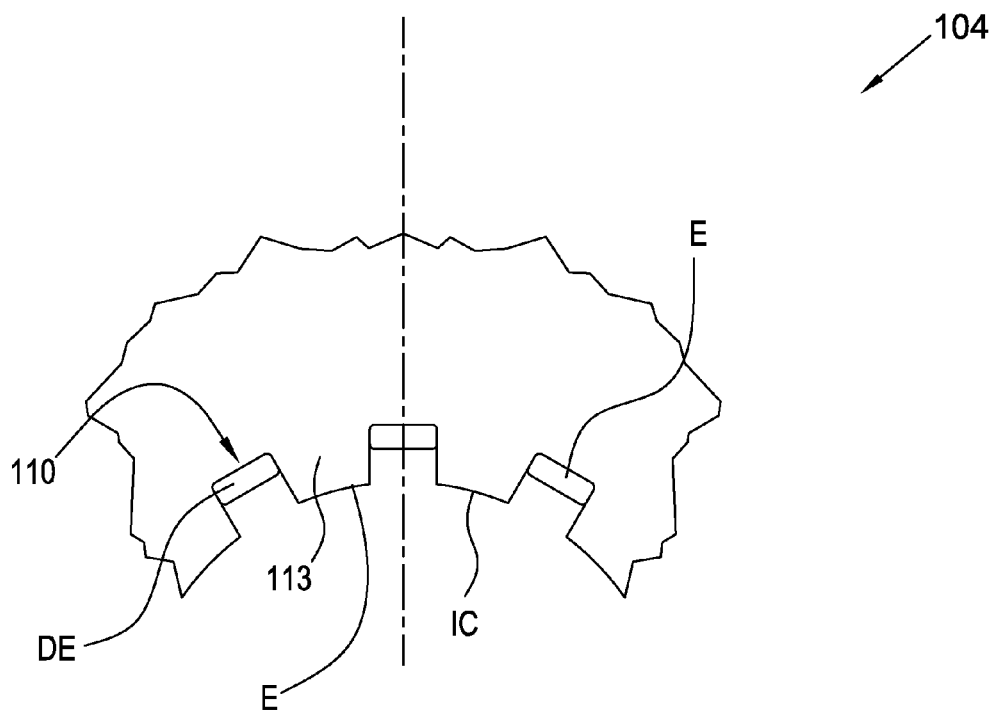
FIG. 7 is a back view of the ring gear carrier shown in FIG. 2.

FIG. 7 is a back view of ring gear carrier 104 shown in FIG. 2. The following should be viewed in light of FIGS. 2 through 7. In an example embodiment, each slot extends further in circumferential direction C than in radial direction R. In an example embodiment, each protrusion extends further in circumferential direction C than in radial direction R.

In an example embodiment, openings formed by the slots are wholly surrounded by portion 106, for example, the slots do not open to outer circumference OC of portion 106. In an example embodiment, each protrusion includes a respective distal end DE and each DE forms a respective portion of an edge for the ring gear carrier, for example edge E, part of which forms inner circumference IC for carrier 104. For example, as described below, IC is punched to form segments 113 and every other segment 113 is axially bent to form a protrusion 110.

In an example embodiment, each slot includes a respective radially outermost edge 112R, and respective corners 114 formed by portion 106 and 112R are rounded. In an example embodiment, the ring gear carrier includes radially disposed portion 116, the protrusions extend axially from portion 116; and, respective corners 118 formed by portion 116 and the protrusions are rounded. In an example embodiment, corners 114 and 118 are complementarily shaped and are matingly engaged. By 'matingly engaged' we mean that the respective radially and axially aligned portions of corners 114 and 118 are in contact.

In an example embodiment, respective segments 120 of portion 116, radially outward from corners 114 are under a first amount of compressive stress, and respective segments 122 of portion 116 axially aligned with corners 118 are under a second amount of compressive stress, greater than the first amount of compressive stress. In general, tensile forces associated with torque loads on assembly 100, in particular on segments 122, work to separate the hub from the ring gear carrier. Advantageously, the creation of additional compressive stress in segments 122 counters the tensile forces, increasing the torque capacity of assembly 100.

Figure 8:
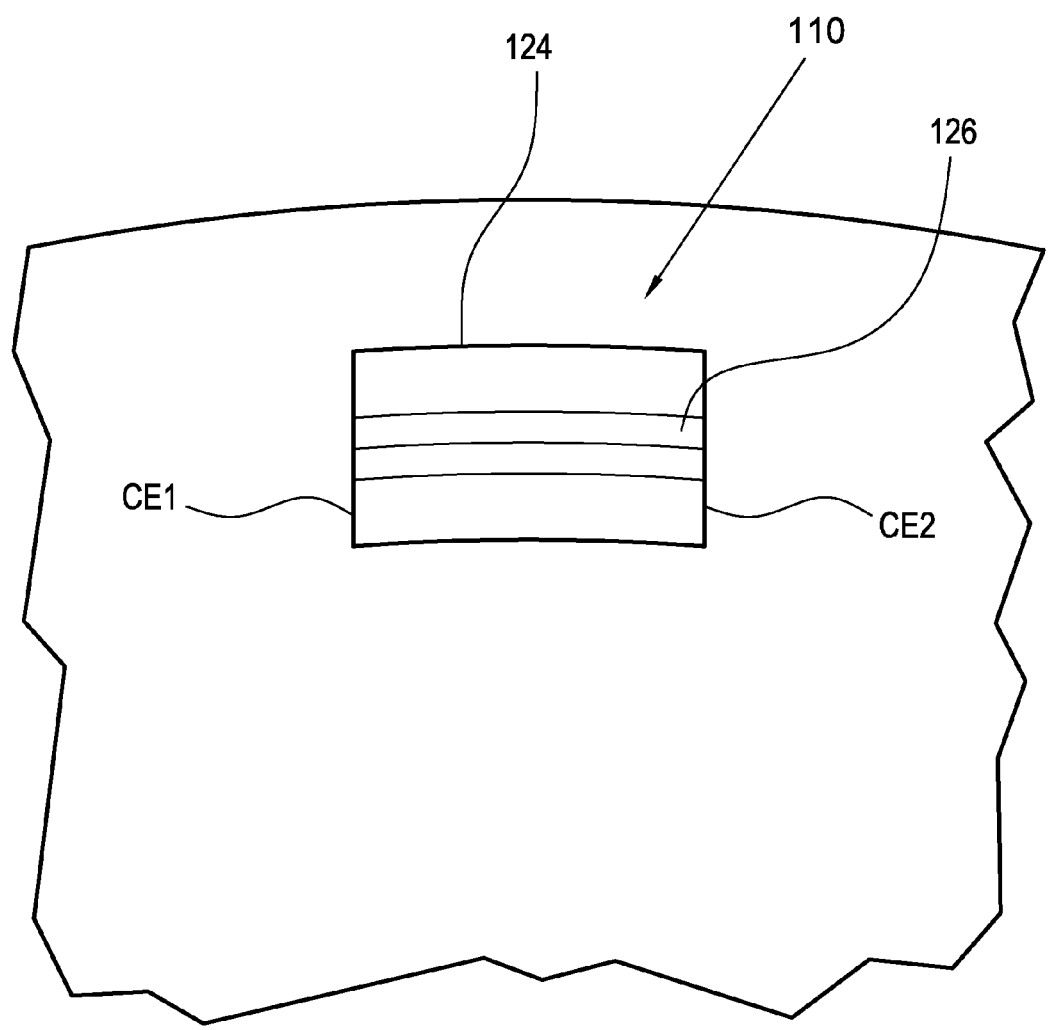
FIG. 8 is a detail of a protrusion in FIG. 2 showing the circumferential groove.

FIG. 8 is a detail of a protrusion in FIG. 2 showing a circumferential groove. The following should be viewed in light of FIGS. 2 through 8. Portion 106 includes surfaces SF1 and SF2 facing in opposite axial directions, for example, in axial directions A1 and A2, respectively. Portion 116, in particular, surface SF3, is in contact with SF1. Each protrusion includes a respective segment 124 in contact with SF2. In an example embodiment, each segment 124 includes surface SF4 facing in the same axial direction as SF2, for example, A2, and including a circumferentially disposed groove 126. Grooves 126, resulting from the axial compression of the protrusions, as described infra, result in an advantageous displacement, radially inward and outward of the slots, of the material forming the portion of the protrusions extending beyond portion 106 in direction A2. In an example embodiment, grooves 126 extend the full circumferential extent of segments 124, for example, from circumferential end CE1 to circumferential end CE2.

In an example embodiment, portion 106 includes sides SD1 and SD2 facing in opposite axial directions, for example, in axial directions A1 and A2, respectively. SD2 includes indented segments 128. Slots 108 are located in the plurality of indented segments.

Figure 9:
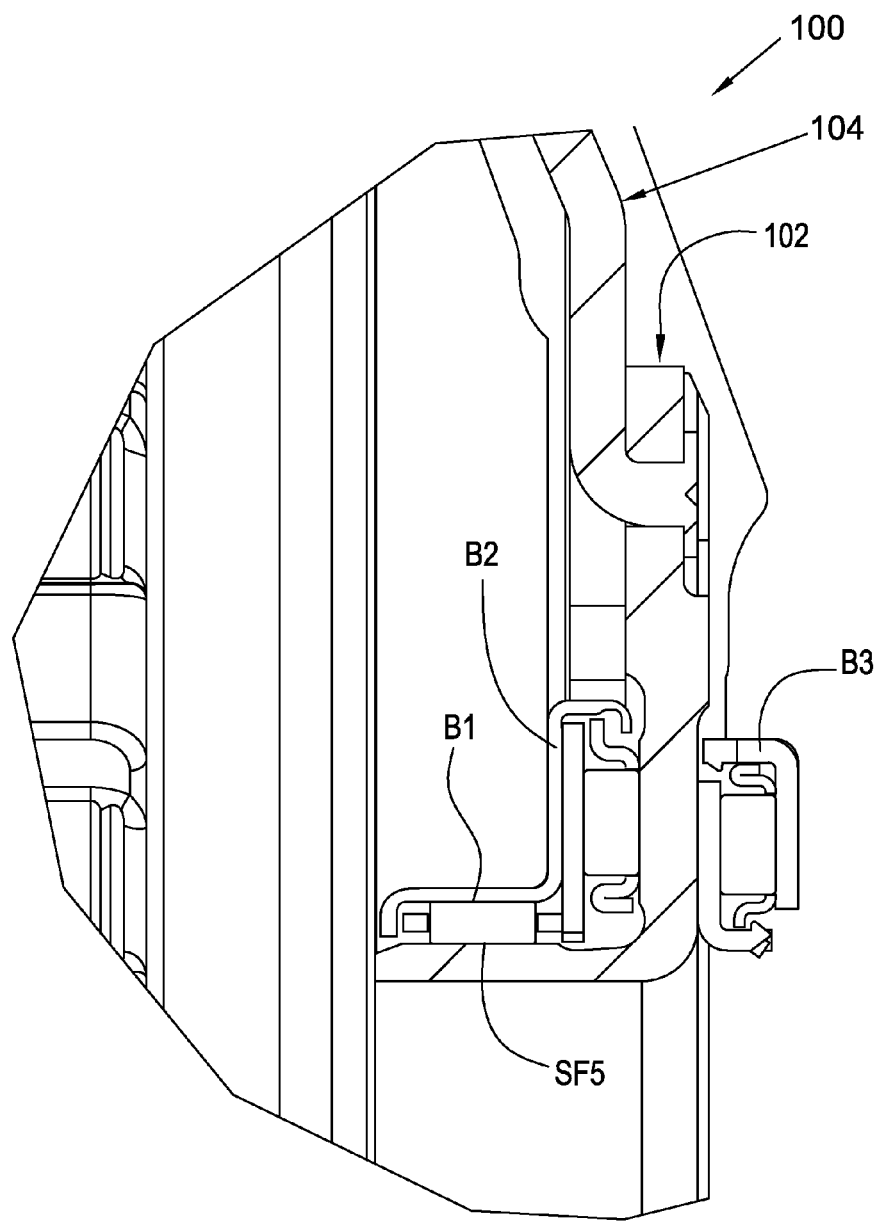
FIG. 9 is a detail of area of area 9 in FIG. 2 showing bearings.

FIG. 9 is a detail of area of area 9 in FIG. 2 showing bearings. The following should be viewed in light of FIGS. 2 through 9. In an example embodiment, assembly 100 is used in a transmission. In an example embodiment, bearings B1 are used to axially guide the assembly and thrust bearings B2 and B3 are used to radially guide the assembly. As further described below, the fabrication of assembly 100 advantageously facilitates the hardening of surface SF5 of the hub upon which bearings B1 ride.

Figure 10:
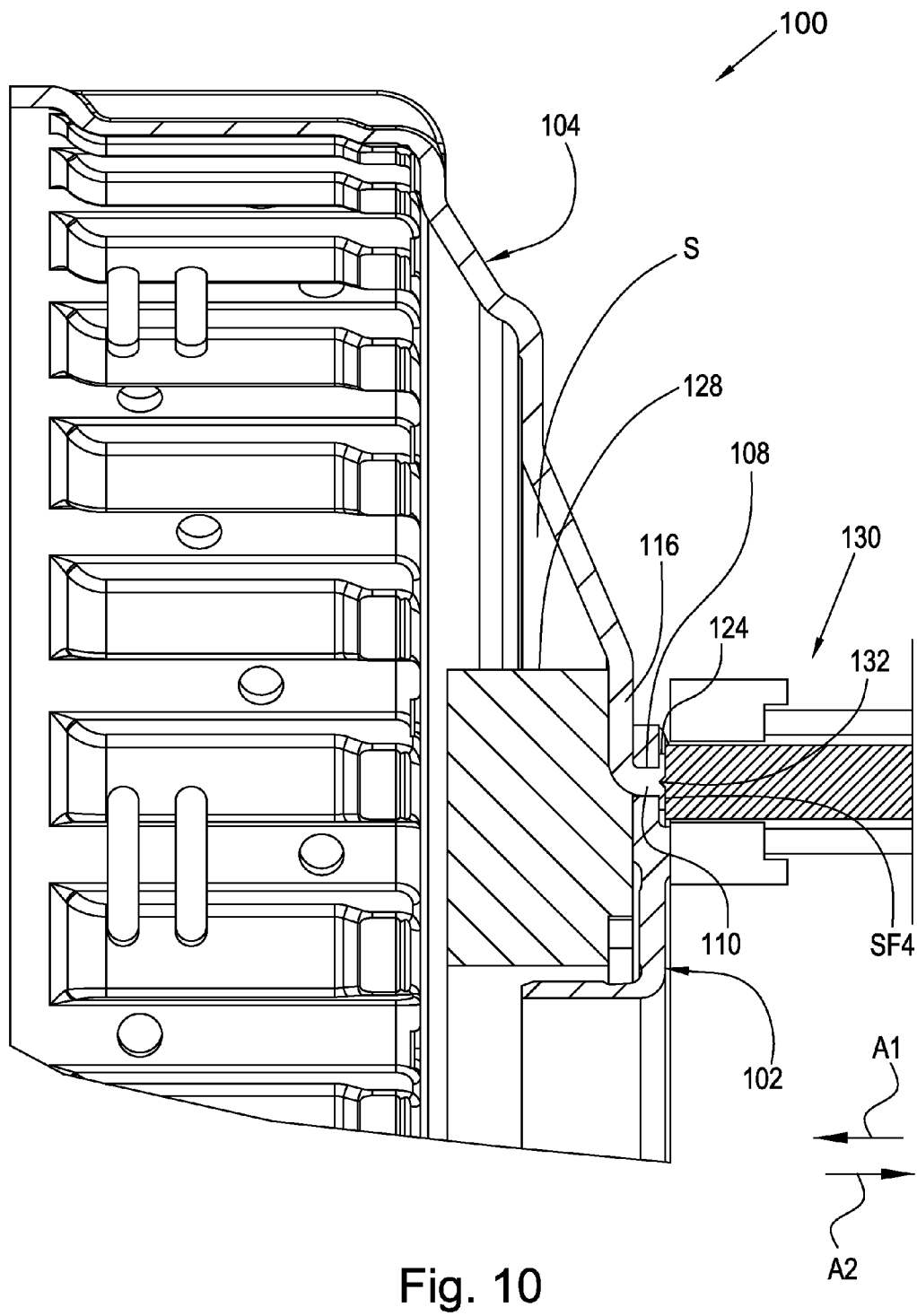
FIG. 10 is a partial cross-sectional view of clutch assembly with a tab rivet connection showing an anvil and punch used in fabrication.

FIG. 10 is a partial cross-sectional view of clutch assembly with a tab rivet connection showing an anvil and punch used in fabrication. The following should be viewed in light of FIGS. 2 through 10. The following described a method of fabricating a clutch assembly. Assembly 100 is used in the example description that follows; however, it should be understood that the method is not limited to the configuration shown and described for assembly 100. One step forms slots 108 in portion 106 of hub 102, such that each slot extends further in circumferential direction C than in radial direction R. Another step forms protrusions 110 extending from portion 116 of ring gear carrier 104 such that each protrusion extends further in direction C than in the direction R. Another step inserts the protrusions in the slots such that respective segments of the protrusions extend beyond portion 106, for example, in direction A2. A further step exerts force on the protrusions such that the protrusions compressively engage portion 106 to fixedly connect the hub to the ring gear carrier.

In an example embodiment, forming slots includes wholly surrounding respective openings formed by the plurality of circumferentially aligned slots with portion 106. For example, the slots do not open to outer circumference OC of portion 106. In an example embodiment, forming the protrusions includes axially bending a plurality of radially aligned segments forming a portion of an inner circumference for the second radially disposed portion, for example segments 113 forming portions of inner circumference IC for portion 116.

In an example embodiment, forming slots includes rounding respective corners 114 formed by portion 106 and respective radially outermost edges 112R of the slots. In an example embodiment, forming the protrusions includes rounding respective corners 118 formed by portion 116 and the protrusions. In an example embodiment, a further step matingly engages the first and second respective corners.

In an example embodiment, exerting force on the plurality of protrusions includes: placing segments 120 of portion 106, radially outward from corners 114, under a first amount of compressive stress, and placing respective segments 122 of portion 106, axially aligned with corners 114, under a second amount of compressive stress, greater than the first amount of compressive stress.

In an example embodiment, inserting the protrusions in the slots includes extending respective segments 124 of the protrusions axially beyond portion 106, and exerting force on the protrusions includes displacing respective portions of segments 124 to contact surface SF2 of portion 106 facing away from the ring gear carrier. In an example embodiment, displacing respective portions of segments 124 includes indenting surface SF4 of portions 124, facing away from the ring gear carrier, to displace the respective portions in radially inward and outward directions, and to form respective circumferentially disposed grooves 126.

In FIG. 10, anvil 128 has been inserted behind portion 116 to axially support portion 116 and the protrusions. Punch 130 applies force in axial direction A1 to the protrusion, in particular, to surface SF4 of segments 124, to compressively engage the protrusions with the hub. As shown by the dashed lines in FIG. 5, prior to upsetting, a radius of corner 118 of protrusion 110 is larger than a radius of corner 114 of slot 108. Furthermore, to accommodate assembly of the carrier to the hub, protrusion 110 is smaller than slot 108. The anvil limits axial motion of the carrier so that the protrusion is radially and circumferentially expanded into the slot, and corner 118 is pressed into contact with corner 114 during the application of force by punch 130, resulting in the increase of compressive stress noted supra on segments 122. As a result of the position of the anvil, step 131 is formed in protrusion 110 by the expansion of the protrusion in response to punch 130. Punch 130 includes protrusion 132, which engages surface SF4 to cause a more uniform and extensive displacement of the material forming the protrusions along and in contact with the slot. The contact of protrusion 132 with surface SF4 results in grooves 126.

The following provides further detail and information regarding assembly 100 and the fabrication of assembly 100. In an example embodiment, indented segments 128 are formed by coining to reduce the thickness of the material forming portion 106 and which is pierced to form slots 108. As well, the coining process eliminates the need for machining of the hub in the areas of the protrusions to reduce the thickness. Machining would result in an interrupted cut that would require deburring at a substantial cost. By 'coining' we mean a process that produces the indented segments by compressing the material in the area of the segments.

In an example embodiment, corners 114 and 118 also are formed by coining process, that is, by applying compressive force to form the corners. The coined corners help to improve fill, that is, the expansion of the protrusions to fill the slot and compressively engaged the hub, and to better seat the hub and the ring gear carrier. In an example embodiment, once the protrusions are inserted into the slots, spring loaded punch 130 provides the axial force noted above, which seats the hub and the ring gear carrier together. During the application of the axial force an additional amount of residual compressive stress is put into corner 114 and segment 122. This residual compressive stress results in a durability improvement, that is, the compressive stress counteracts the tensile stresses associated with operation of assembly 100. Protrusion 132 helps to distribute material to both radial sides of the slots.

In an example embodiment, while punch 130 is applying force, the protrusions are fully supported through corner 118 with anvil 128 to prevent the protrusions from being pushed back out of the slot.

Advantageously, the configuration of assembly 100 minimizes the axial extent of the ring gear carrier, in particular, the axial extent of space S needed to accommodate the anvil. Assembly 100 also replaces welding of the hub to the ring gear carrier. Welding would undesirably increase cost and complexity for fabricating assembly 100 and could result in undesirably heating and possible warping of parts forming the assembly.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What I claim is:

1. A clutch assembly, comprising:
   a hub including a first radially disposed portion with a plurality of circumferentially aligned slots passing through the first radially disposed portion; and,
   a ring gear carrier including a plurality of protrusions disposed in the plurality of circumferentially aligned slots and in compressive engagement with the hub to fixedly connect the hub to the carrier, wherein:
   each slot in the plurality of circumferentially aligned slots extends further in a circumferential direction than in a radial direction;
   each protrusion in the plurality of protrusions extends further in the circumferential direction than in the radial direction;
   the first radially disposed portion includes first and second surfaces facing in opposite axial directions;
   the ring gear carrier includes a second radially disposed portion in contact with the first surface; and,
   each protrusion in the plurality of protrusions includes a respective segment in contact with the second surface.

2. The clutch assembly of claim 1, wherein respective openings formed by the plurality of circumferentially aligned slots are wholly surrounded by the first radially disposed portion.

3. The clutch assembly of claim 1, wherein each protrusion from the plurality of protrusions includes a respective distal end forming a respective portion of an edge for the ring gear carrier.

4. The clutch assembly of claim 1, wherein:
   each slot in the plurality of circumferentially aligned slots includes a respective radially outermost edge;
   first respective corners formed by the first radially disposed portion and the respective radially outermost edge are rounded;

the ring gear carrier includes a second radially disposed portion; and, second respective corners formed by the second radially disposed portion and the plurality of protrusions are rounded and matingly engaged with the first respective corners.

5. The clutch assembly of claim 4, wherein:
first respective segments of the second radially disposed portion radially outward from the second respective corners are under a first amount of compressive stress; and,
second respective segments of the second radially disposed portion axially aligned with the second respective corners are under a second amount of compressive stress, greater than the first amount of compressive stress.

6. The clutch assembly of claim 1, wherein said respective segment includes a third surface facing in a same axial direction as the second surface and including a circumferentially disposed groove.

7. The clutch assembly of claim 1, wherein:
the first radially disposed portion includes first and second sides facing in opposite axial directions;
the ring gear carrier includes a second radially disposed portion in contact with the first side;
the first side includes a plurality of indented segments; and,
the plurality of circumferentially aligned slots are located in the plurality of indented segments.

8. A method of fabricating a clutch assembly, comprising:
forming a plurality of circumferentially aligned slots in a first radially disposed portion of a hub, such that each slot in the plurality of circumferentially aligned slots extends further in a circumferential direction than in a radial direction;
forming a plurality of protrusions extending from a second radially disposed portion of a ring gear carrier such that each protrusion in the plurality of protrusions extends further in the circumferential direction than in the radial direction;
inserting the plurality of protrusions in the plurality of circumferentially aligned slots such that respective segments of the plurality of protrusions extend beyond the first radially disposed portion; and,
exerting force on the plurality of protrusions such that the plurality of protrusions compressively engage the first radially disposed portion to fixedly connect the hub to the ring gear carrier, wherein forming a plurality of protrusions includes axially bending a plurality of radially aligned segments forming a portion of an inner circumference for the second radially disposed portion.

9. The method of claim 8, wherein forming a plurality of circumferentially aligned slots includes wholly surrounding respective openings formed by the plurality of circumferentially aligned slots with the first radially disposed portion.

10. The method of claim 8, wherein:
forming a plurality of circumferentially aligned slots includes rounding first respective corners formed by the first radially disposed portion and respective radially outermost edges of the plurality of circumferentially aligned slots; and,
forming a plurality of protrusions includes rounding second respective corners formed by the second radially disposed portion and the plurality of protrusions, the method further comprising matingly engaging the first and second respective corners.

11. The method of claim 10, wherein exerting force on the plurality of protrusions includes:

placing first respective segments of the first radially disposed portion, radially outward from the first respective corners, under a first amount of compressive stress; and,
placing second respective segments of the first radially disposed portion, axially aligned with the second respective corners, under a second amount of compressive stress, greater than the first amount of compressive stress.

12. The method of claim 8, wherein:
inserting the plurality of protrusions in the plurality of circumferentially aligned slots includes extending respective segments of the plurality of protrusions axially beyond the first radially disposed portion; and,
exerting force on the plurality of protrusions includes displacing respective portions of the respective segments to contact a surface of the first radially disposed portion facing away from the ring gear carrier.

13. The method of claim 12, wherein displacing respective portions of the respective segments includes indenting a surface of the respective portions, facing away from the ring gear carrier, to displace the respective portions in radially inward and outward directions, and to form respective circumferentially disposed grooves.

14. A clutch assembly, comprising:
a hub including:
a first radially disposed portion including a first surface facing in a first axial direction; and,
a plurality of circumferentially aligned slots in the first radially disposed portion; and,
a ring gear carrier including:
a second radially disposed portion:
including a second surface in contact with the first surface and facing in a second axial direction opposite the first axial direction; and,
a plurality of protrusions:
forming a radially innermost circumference for the ring gear carrier;
extending in the second axial direction from the second radially disposed portion;
disposed in the plurality of circumferentially aligned slots;
forming respective portions of the ring gear carrier extending furthest in the second axial direction; and,
in compressive engagement with the first radially disposed portion to fixedly connect the hub to the carrier, wherein:
respective openings formed by the plurality of circumferentially aligned slots are wholly surrounded by the first radially disposed portion;
each slot in the plurality of circumferentially aligned slots extends further in a circumferential direction than in a radial direction; and,
each protrusion in the plurality of protrusions extends further in the circumferential direction than in the radial direction.

15. The clutch assembly of claim 14, wherein:
the hub includes respective first rounded corners formed by the first radially disposed portion and respective radially outermost edges of the plurality of circumferentially aligned slots;
the ring gear carrier includes respective second rounded corners formed by the second radially disposed portion and respective radially outwardly facing surfaces of the plurality of protrusions;
the first and second respective corners are matingly engaged;

first respective segments of the first radially disposed portion radially outward from the first respective corners are under a first amount of compressive stress; and, second respective segments of the first radially disposed portion axially aligned with the first respective corners are under a second amount of compressive stress, greater than the first amount of compressive stress.

16. The clutch assembly of claim 15, wherein:

the first radially disposed portion includes a third surface facing in the second axial direction;

each protrusion in the plurality of protrusions includes a respective segment in contact with the third surface; and said respective segment includes a fourth surface facing in the first axial direction and including a circumferentially disposed groove.

17. The clutch assembly of claim 14, wherein each protrusion from the plurality of protrusions includes a respective distal end forming a respective portion of an edge of the ring gear carrier.

* * * * *